O. F. SUNDEN.
TREAD PLATE FOR PEDALS.
APPLICATION FILED JUNE 25, 1915.
1,210,016.
Patented Dec. 26, 1916.
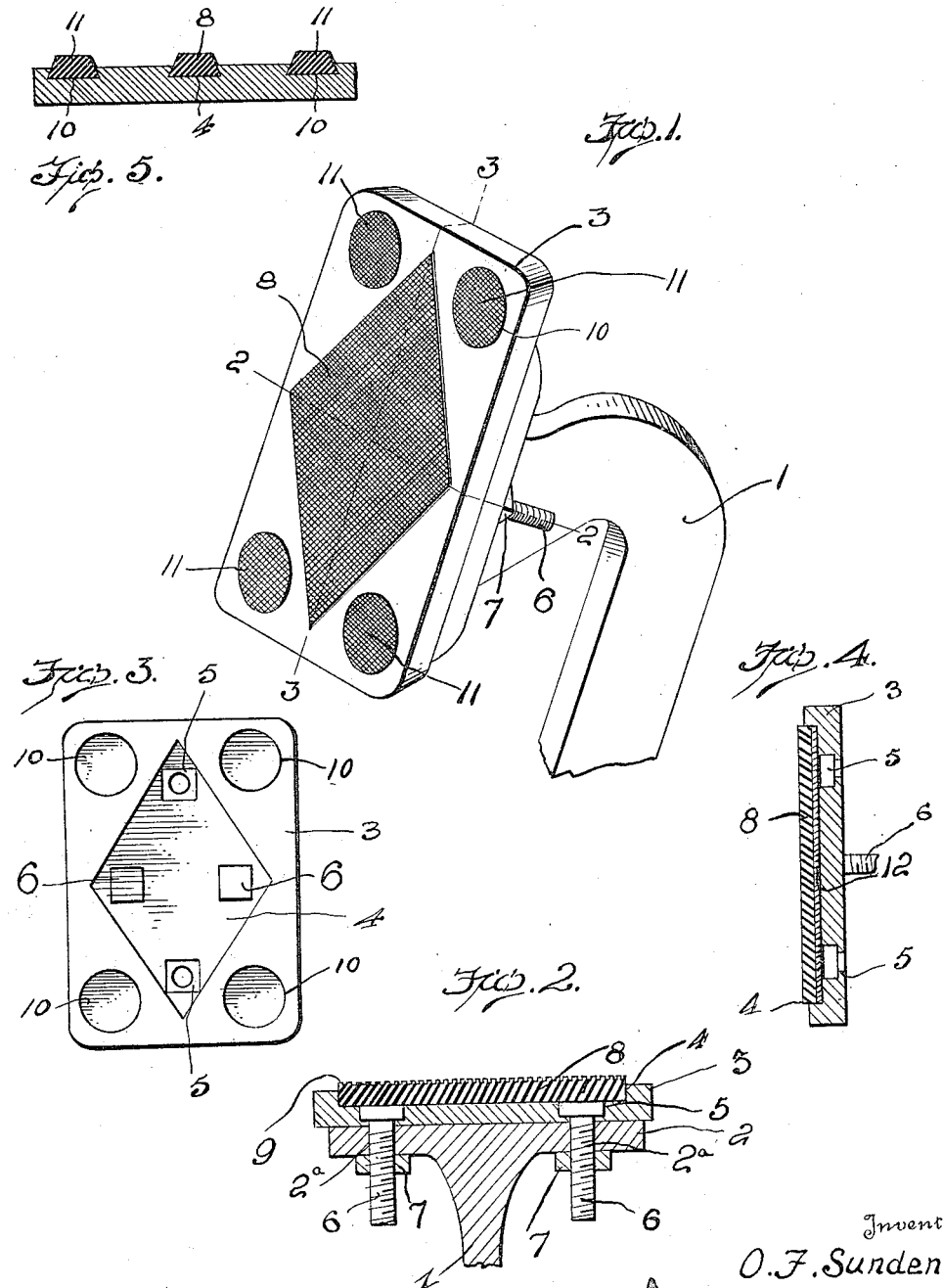

UNITED STATES PATENT OFFICE.

OTTO F. SUNDEN, OF BROCKTON, MASSACHUSETTS.

TREAD-PLATE FOR PEDALS.

1,210,016.   Specification of Letters Patent.   Patented Dec. 26, 1916.

Application filed June 25, 1915. Serial No. 36,273.

*To all whom it may concern:*

Be it known that I, OTTO F. SUNDEN, a citizen of the United States, residing at Brockton, in the county of Plymouth and State of Massachusetts, have invented certain new and useful Improvements in Tread-Plates for Pedals; and I do hereby declare the following to be a full, clear, and exact description of the invention, such as will enable others skilled in the art to which it appertains to make and use the same.

This invention relates to new and useful improvements in pedals and has for one of its objects the provision of a tread plate which will prevent the operator's foot from accidentally slipping therefrom.

Another object of this invention is the provision of means for attaching the tread plate to the pedal which can be readily and quickly removed when desired.

A further object is the provision of a device of the character described wherein a plurality of non-slipping blocks are sunken within the tread-plate forming a gripping surface to the device.

A still further object is the provision of a device of the character described which is of few parts and can be easily and cheaply manufactured; wherein it is described, claimed and illustrated in the accompanying drawings, in which—

Figure 1 is a perspective view of my invention, showing the tread plate applied to a pedal, Fig. 2 is a sectional view taken on the plane indicated by the line 2—2 of Fig. 1, illustrating means for securing the tread plate to the pedal. Fig. 3 is a plan view illustrating the non-slipping blocks removed therefrom, Fig. 4 is a longitudinal sectional view taken on the plane indicated by the line 3—3 of Fig. 1, illustrating the filler blocks placed in the recesses, and Fig. 5 is a sectional view illustrating the slightly modified forms of blocks.

In the drawings, 1 designates a shank and 2 the head of an operating pedal of a well known type. The head 2 is provided with apertures $2^a$ to permit my improved tread plate 3 to be applied to the operating pedal by means of bolts 6. The tread plate 3 is preferably oblong in outline and is preferably made of metal. A diamond-shaped recess 4 is formed in the center of the upper faces of the tread plate 3, and in the corners of this recess are countersunk apertures 5, and the countersinks of the apertures being rectangular. The tread plate 3 is secured to the head $2^a$ by means of the bolts 6 and nuts 7. The bolts 6 are provided with rectangular heads which fit in the countersinks 5 and are thereby held against turning during the application or removal of the nuts 7.

A diamond-shaped block 8 of rubber or any other material of non-slipping quality is inserted in the recess 4 and is held therein against accidental displacement by means of glue, cement or any other adhesive. The block 8 projects beyond the outer face of the tread plate 3 so as to permit the operator's foot to engage the same. To provide a more effective engagement of the blocks 8, the outer surface may be roughened as indicated by 9 in Figs. 1 and 2.

A plurality of circular recesses 10 are formed in the face of the tread plate 3 adjacent the corner thereof and beyond the diamond-shaped recess 4. Mounted in these recesses 10 are cylindrical blocks 11 of rubber or any other suitable material of non-slipping quality, and they may be secured in the recesses by means of glue, cement or any other adhesive. The blocks 11 also project beyond the outer face of the tread plate 3 and the outer faces are preferably disposed in the plane of the outer faces of the block 8. The outer face of the block 11 may also be roughened.

By positioning the diamond-shaped block in the center of the tread plate 3 and the circular block 11 in the corner of said plate there is provided a non-slipping bearing surface which will permit the operator's foot from coming in contact with the metal plate 3 and which will insure a positive engagement of the operator's foot with the tread plate. The outlines or contours of the blocks, and their relative arrangement, provide the tread plate with a friction surface of the maximum area with the use of a minimum amount of material. If after constant usage, the non-slipping blocks become worn so that they will be below the outer face of the plate 3, they can be easily and quickly removed by a sharp instrument and a filler block 12, as illustrated in Fig. 4, may be placed within the recesses 4 and 10 so as to raise said blocks above the surface of the plate 3 to insure further usage of said blocks.

By reference to Fig. 5 of the drawings it will be seen that the blocks 8 and 11 may be secured in the recesses 4 and 10 without the use of glue or other adhesive. In this figure the side walls of the recesses are undercut to engage and overlie the beveled side walls of the blocks 8 and 11. In this form, the blocks 8 and 11 will be securely retained in the recess but may be removed when found necessary to employ a filler plate to raise the outer face of the blocks above the outer face of the tread plate 3.

Having thus described my invention, what I claim is:

In combination, an operating pedal including a shank and an oblong head in outline having pairs of oppositely disposed openings, of an oblong tread plate in outline and of larger dimensions than the head, said tread plate having a centrally arranged diamond shaped recess and circular recesses arranged adjacent each corner thereof, said diamond shaped recess having formed in the bottom wall thereof and adjacent each corner a squared counter-sunk aperture adapted to register with the openings formed in the head, bolts having squared heads received within the counter-sunk apertures and extending through the openings in the head, nuts threaded to the bolts for retaining the tread plates upon the head, said squared heads of the bolts lying flush with the face of the bottom wall of the diamond shaped recess to present a smooth bearing surface, a diamond shaped non-slipping block secured within the diamond shaped recess and projecting above the bearing plate, and circular non-slipping blocks secured within the circular recesses and projecting above the bearing plate to coöperate with the diamond shaped block for providing a friction surface of a maximum area with the use of a minimum amount of material.

In testimony whereof I affix my signature in presence of two witnesses.

OTTO F. SUNDEN.

Witnesses:
FRANCIS M. TINKHAM,
SAMUEL D. ALDEN.

Copies of this patent may be obtained for five cents each, by addressing the "Commissioner of Patents. Washington, D. C."